March 19, 1929.　　　N. P. WAGNER　　　1,706,268
CHAIN CONVEYER
Filed May 29, 1924
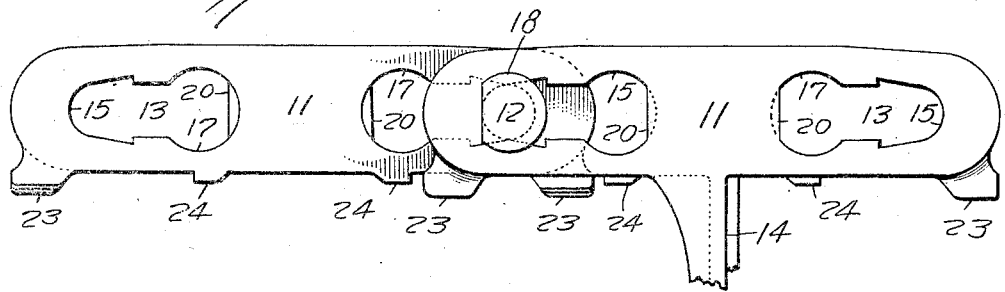
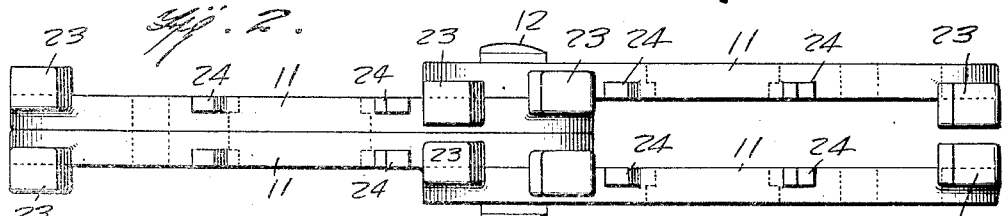
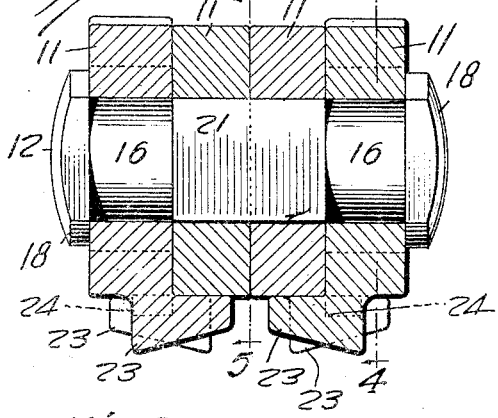
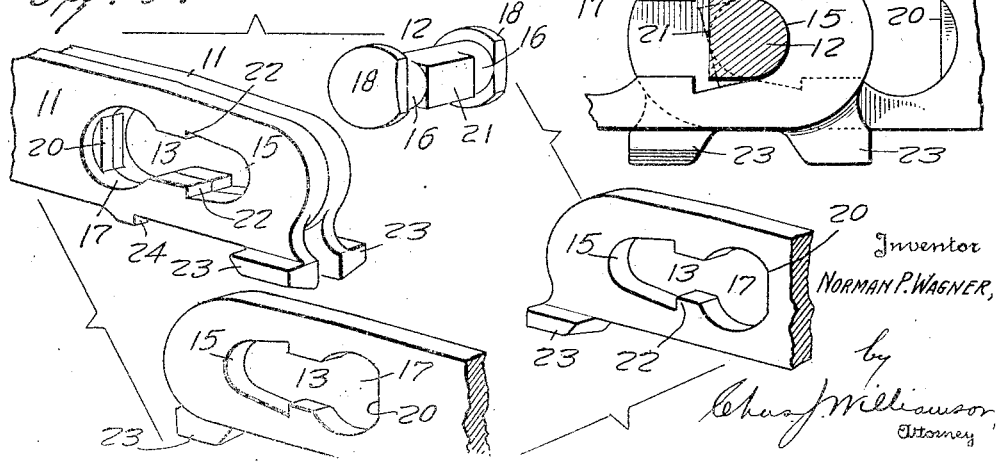
Inventor
NORMAN P. WAGNER,
by
Chas. J. Williamson
Attorney Patented Mar. 19, 1929.

1,706,268

UNITED STATES PATENT OFFICE.

NORMAN PAUL WAGNER, OF TAMAQUA, PENNSYLVANIA.

CHAIN CONVEYER.

Application filed May 29, 1924. Serial No. 716,807.

Conveyer chains made of links and flights which move objects or material along a trough by engagements of the flights thereof on the forward or advancing side are apt under pressure from the load upon the flights to ride over the material by bending outward or upward at the joint between the links so that the flights will move along carrying little or no load. An important object of my invention is to prevent this occurrence. Another object of my invention is a pivot connection between the links that is readily insertable and removable when occasion arises and which though requiring no nuts or other securing means will nevertheless be safe from the likelihood of accidental removal. Since the type of chain in which my invention is embodied is one in which the links are slidable endwise with reference to one another for assembly, a still further object of my invention is to prevent unintentional or accidental sliding or telescoping. Yet another object is to make the inside and outside links interchangeable and avoid a construction which requires right and left hand constructions.

My invention consists in whatever is described by or is included within the terms or scope of the appended claims.

In the annexed drawings:

Fig. 1 is a side elevation of a section of conveyer chain embodying my invention;

Fig. 2 is a bottom plan view thereof;

Fig. 3 is a transverse section through the pivot pins or bolts;

Fig. 4 is a section on line 4—4 of Fig. 3;

Fig. 5 is a section on line 5—5 of Fig. 3;

Fig. 6 is a perspective view of end portions of connected links and the pivot pin or bolt with the same separated.

My chain as made up or assembled consists of similar links, 11, placed so that there are two inside links placed side by side and lying between two outside links at their extremities through alining holes in which is situated the pivot bolt or pin, 12.

Each link has a longitudinally extending slot, 13, which extends in the direction from the middle portion of the link to the end thereof (the flight, 14, being mounted between the inner ends of the slots) which slot at its outer end terminates in a half round hole, 15, that fits with a free turning fit the cylindrical portion, 16, of the pivot pin or bolt and at its inner end said slot terminates or enlarges into a circular hole, 17, whose diameter is that of a head or enlargement, 18, at each end of the pivot pin or bolt so that the pivot pin or bolt may be slid endwise through said opening, 17. The heads of the pin or bolt are not perfectly round but each is slabbed off or flattened at one side and a portion of each link hole, 17, in a direction transversely of the link and on the side towards the center of the link has a flat side, 20, corresponding with the flattened sides of the pin head so that each link hole, 17, has a round portion and alongside the round portion has a flattened portion so that to pass the pivot pin or bolts through the links it must be repeatedly turned through 180 degrees and moved endwise between the successive turns so as to avoid the obstructions which the inwardly projecting flattened portions of the holes, 17, constitute to endwise movement of the pivot pin or bolt. It will thus be seen that repeated turns in opposite directions through 180 degrees must be made of the pivot pin or bolt followed by longitudinal movements thereof to effect the removal of the bolt from the links and it is impossible that such movements can accidentally take place.

Between the two rounded portions of the pivot pin or bolt at the ends thereof it has a squared or rectangular portion, 21, which when the parts are assembled lies between or extends across the slots of the two inside links so that at such portion of its length said pivot pin or bolt in cross section is half cylindrical and half square the cylindrical portion lying in contact with the rounded end of the slot. The link slots from such rounded end inward are enlarged to provide in the top and bottom wall of each slot an inwardly extending shoulder, 22, which by the rocking or turning of the pivot pin or bolt upon its axis will be engaged by a corner of the square portion of the bolt and thus telescoping movement of the links will be prevented. The pivot pin or bolt is so rocked automatically as soon as telescoping of the links commences by the friction of the sliding links upon the pivot pin or bolt. The locking position of the bolt under the conditions just described is indicated in dotted lines in Fig. 5.

It will be seen that as only the outer links engage a completely cylindrical portion of the pivot pin or bolt the only rocking motion of the links on the pivot pin or bolt takes place with the outer links and thus wear occurs only on them and not on the inner links, and in replacing worn links the new links may if desired, be made the inner links and the previous inner links made the outside links, this being feasible because there are no rights or lefts but all of the links have precisely the same construction.

Each link 11, at each end and at the bottom thereof has a laterally extending lug, 23, which when the links are assembled extends beneath the adjacent link and constitutes a stop which positively holds the link from turning under pressure of the load on the forward side of the flight, 14, which would tend to rock the link on the pivot pin or bolt and thus allow the flight to climb up or ride on or over the load, but this arrangement does not prevent the bending of the chain at the pivots between the links in the direction required for the chain to pass over the sprocket wheel. Thus bending of the chain can only take place in one direction.

As a still further precaution against unintentional sliding or telescoping of the links upon one another each link on its under or outer side at a point where it will be engaged by the adjacent stop lug, 23, on an adjoining link has a lug, 24, which by contact with said stop lug, 23, will stop any sliding movement. To uncouple or disconnect overlapping links by the removal of the pivot pin or bolt it is necessary merely to rock such links upon the pivot pin or bolt until the lugs, 23, and 24 which normally cooperate to prevent endwise movement of the links will clear each other.

My invention is applicable to conveyer chains which have other object engaging members than flights.

What I claim is:—

1. A conveyer chain having flight carrying links, a pivotal connection between overlapping links and a stop on one link situated to engage an adjoining link, and a lug on one link in the path of the stop on a connected link when endwise movements of the links relative to one another takes place.

2. The combination of side by side links with overlapping portions, a pivot pin or bolt passing through such overlapping portions each link having a longitudinally extending slot with an enlargement at the end towards the center of the link and the pivot pin or bolt having a head at each end with a flattened side to match a flattened surface on said slot enlargement, said pin being rotatable on its axis to clear said flattened portion of the slot enlargement.

3. The combination of side by side links with overlapping portions each link having a longitudinally extending slot terminating in a pivot bearing, a pivot passing through alining portions of the slots of the links and means that limit telescopic movement of one link over another comprising, shoulders on the slot walls and surfaces on the pin that engage such shoulders on the partial rocking of the pin the pivot having rounded portions in contact with side walls of the slot, the link being movable longitudinally and by friction of the slot wall with the rounded portion of the pivot causing the partial rocking thereof to cause interengagement of said shoulders and surfaces.

4. The combination of side by side links with overlapping portions, each link having a longitudinally extending slot terminating in a pivot bearing, pivots passing through aligning portions of the slots of the links said slots having a formation at one point lengthwise of the link allowing the lateral passage of the pivots therethrough having cylindrical portions engaged by straight walls of the slots adapted by longitudinal movement of the links in the direction to place said slot formation and pivots in position for such lateral passage to rotate the pivots by friction therewith, shoulders on the side walls of the links and angular projections on the pivots situated to engage such shoulders when the pivots are rocked as aforesaid.

5. The combination of side by side links with overlapping portions each link having a longitudinally extending slot terminating in a pivot bearing, pivots passing through alining portions of the slots of the links said slots having a formation at one point lengthwise of the link allowing the lateral passage of the pivots therethrough, the links being free to slide telescopically over one another in opposite directions, and means to stop such sliding motion in the direction to place said slot formation and pivots in position for such lateral passage comprising cooperating portions on link and pin normally out of engagement and brought into engagement by such telescopic movement of the links.

In testimony whereof I hereunto affix my signature.

NORMAN PAUL WAGNER.